(12) United States Patent
Wang et al.

(10) Patent No.: US 9,569,029 B2
(45) Date of Patent: Feb. 14, 2017

(54) BASELINE MANAGEMENT WITH LARGE INPUT OBJECT DETECTION

(71) Applicant: Synaptics Incorporated, San Jose, CA (US)

(72) Inventors: Ying Wang, Fremont, CA (US); Tyler Moore, Redwood City, CA (US); Vijay Venkatesh Mahalingam, Sunnyvale, CA (US); Derek Solven, San Jose, CA (US); Earl Peng, Cupertino, CA (US); Nickolas Fotopoulos, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 14 days.

(21) Appl. No.: 14/625,306

(22) Filed: Feb. 18, 2015

(65) Prior Publication Data

US 2016/0239139 A1 Aug. 18, 2016

(51) Int. Cl.
*G06F 3/041* (2006.01)
*G06K 9/00* (2006.01)
*G06F 3/044* (2006.01)

(52) U.S. Cl.
CPC ............ *G06F 3/0416* (2013.01); *G06F 3/044* (2013.01); *G06K 9/00221* (2013.01); *G06K 9/00228* (2013.01); *G06K 9/00234* (2013.01); *G06K 9/00993* (2013.01)

(58) Field of Classification Search
CPC ...... G06F 3/044; G06F 3/0416; G06F 3/0488; G06F 3/0412; G06F 2203/04108; G06F 3/04883; G06F 3/041; G06F 2203/04104; G06F 2203/04808; G06F 2203/04101; G06F 3/017; G06F 2203/04106

USPC .................................................. 345/173, 174
See application file for complete search history.

(56) References Cited

U.S. PATENT DOCUMENTS

| | | | |
|---|---|---|---|
| 7,205,777 B2 | 4/2007 | Schulz et al. | |
| 7,570,064 B2 | 8/2009 | Roziere | |
| 7,876,106 B2 | 1/2011 | Hansen et al. | |
| 2011/0291944 A1* | 12/2011 | Simmons | G06F 3/0416 345/173 |

(Continued)

FOREIGN PATENT DOCUMENTS

| | | |
|---|---|---|
| WO | 2013079267 A1 | 6/2013 |
| WO | 2013159483 A1 | 10/2013 |

*Primary Examiner* — Koosha Sharifi-Tafreshi
(74) *Attorney, Agent, or Firm* — Osha Liang LLP

(57) ABSTRACT

A method for face detection management includes determining, for a first time, a presence of an input object in a sensing region of a capacitance input device. The presence is determined for the first time using a first baseline, and the input object satisfies a size threshold. The method further includes suppressing a reporting of capacitance input device during a predefined time period based on the presence of the input object, determining a disabled state of a display of a host, wherein the disabled state is in response to determining the presence of the input object for the first time, and determining, in response to an elapse of the predefined time period and for a second time, an absence of the input object in the sensing region. The absence of the input object is determined for the second time using a second baseline to account for the disabled state of the display. The method further includes performing an action based on determining the absence of the input object.

20 Claims, 8 Drawing Sheets

(56) References Cited

U.S. PATENT DOCUMENTS

| | | | |
|---|---|---|---|
| 2012/0075249 A1 | 3/2012 | Hoch | |
| 2013/0076688 A1* | 3/2013 | Tokutake | G06F 3/044 |
| | | | 345/174 |
| 2013/0222332 A1* | 8/2013 | Kyrynyuk | G06F 3/0416 |
| | | | 345/174 |
| 2014/0062896 A1* | 3/2014 | Vieta | H04M 1/72519 |
| | | | 345/173 |

* cited by examiner

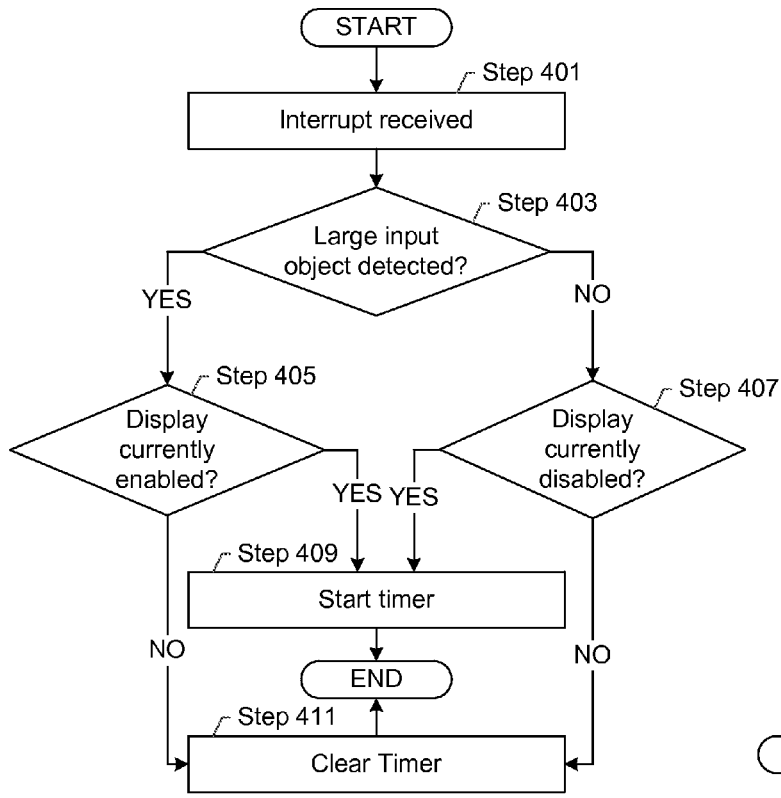
FIG. 4.1
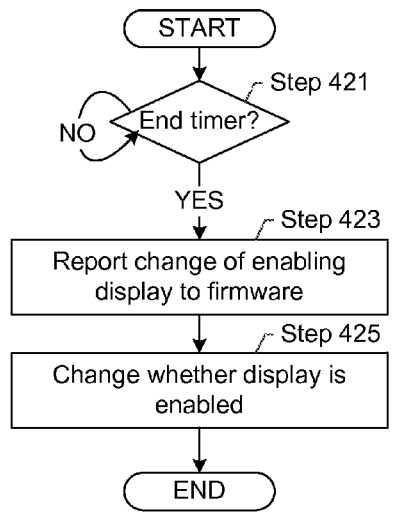
FIG. 4.2

BASELINE MANAGEMENT WITH LARGE INPUT OBJECT DETECTION

FIELD OF THE INVENTION

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a method for face detection management. The method includes determining, for a first time, a presence of an input object in a sensing region of a capacitance input device. The presence is determined for the first time using a first baseline, and the input object satisfies a size threshold. The method further includes suppressing a reporting of capacitance input device during a predefined time period based on the presence of the input object, determining a disabled state of a display of a host, wherein the disabled state is in response to determining the presence of the input object for the first time, and determining, in response to an elapse of the predefined time period and for a second time, an absence of the input object in the sensing region. The absence of the input object is determined for the second time using a second baseline to account for the disabled state of the display. The method further includes performing an action based on determining the absence of the input object.

In general, in one aspect, embodiments relate to a processing system for capacitance sensing of a capacitive input device. The processing system includes a sensor module comprising sensor circuitry coupled to sensor electrodes. The sensor module is configured to generate sensing signals received with the sensor electrodes. The processing system further includes a determination module connected to the sensor electrodes. The determination module is further configured to obtain a profile from the sensing signals, and determine, for a first time, a presence of an input object in a sensing region using the profile. The presence is determined for the first time using a first baseline, and the input object satisfies a size threshold. The determination module is further configured to suppress a reporting of the capacitance input device during a predefined time period based on the presence of the input object, and determine a disabled state of a display of a host. The disabled state is in response to determining the presence of the input object for the first time. The determination module is further configured to change, in response to the disabled state of the display, the first baseline to a second baseline to account for the disabled state of the display, and determine, in response to an elapse of the predefined time period and for a second time, an absence of the input object in the sensing region. The absence of the input object is determined for the second time using the second baseline. The determination module is further configured to issue a report to the host based on determining the absence of the input object.

In general, in one aspect, embodiments relate to an input device that includes sensor electrodes configured to generate sensing signals, and a processing system connected to the sensor electrodes. The processing system is configured to obtain a profile from the sensing signals, and determine, for a first time, a presence of an input object in a sensing region using the profile. The presence is determined for the first time using a first baseline, and the input object satisfies a size threshold. The processing system is further configured to suppress a reporting of the input device during a predefined time period based on the presence of the input object, and determine a disabled state of a display of a host. The disabled state is in response to determining the presence of the input object for the first time. The processing system is further configured to change, in response to the disabled state of the display, the first baseline to a second baseline to account for the disabled state of the display, and determine, in response to an elapse of the predefined time period and for a second time, an absence of the input object in the sensing region. The absence of the input object is determined for the second time using the second baseline. The processing system is further configured to issue a report to the host based on determining the absence of the input object.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and:

FIGS. 2, 3, 4.1, 4.2, 5, and 7 show flowcharts in accordance with one or more embodiments of the invention.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability.

One or more embodiments of the invention are directed to baseline management when a display is disabled based on large input object detection. In particular, in response to a large input object being detected with a first baseline, the display is disabled. The disabling of the display may cause the first baseline to no longer reflect background capacitance. Thus, the first baseline is switched to a second baseline even when the input object is in the sensing region. Using the second baseline, a determination may be made whether the input object is in the sensing region.

Figure 1:
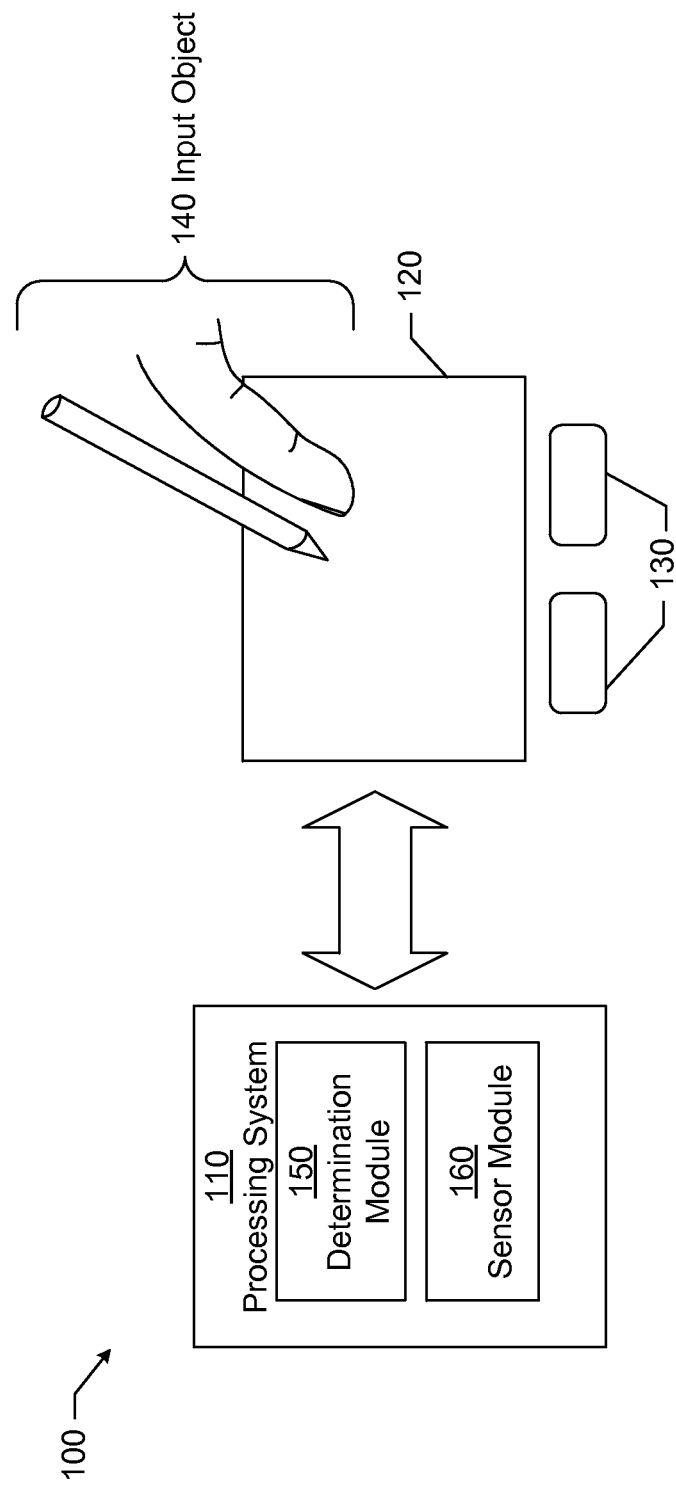
FIG. 1 is a block diagram of an example system that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine a size of the input object, perform baseline management, determine positional information based on a current baseline, determine an action to perform based on the positional information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
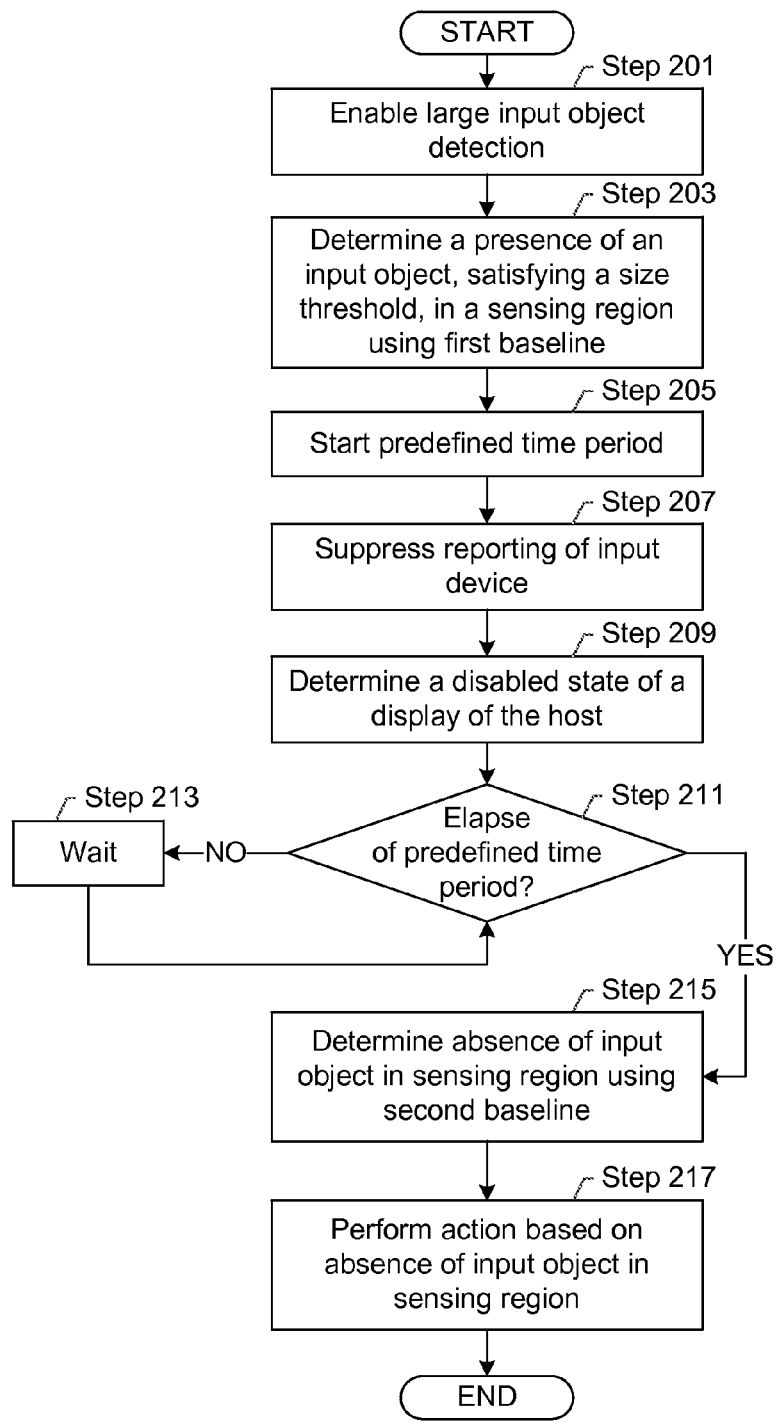
Figure 3:
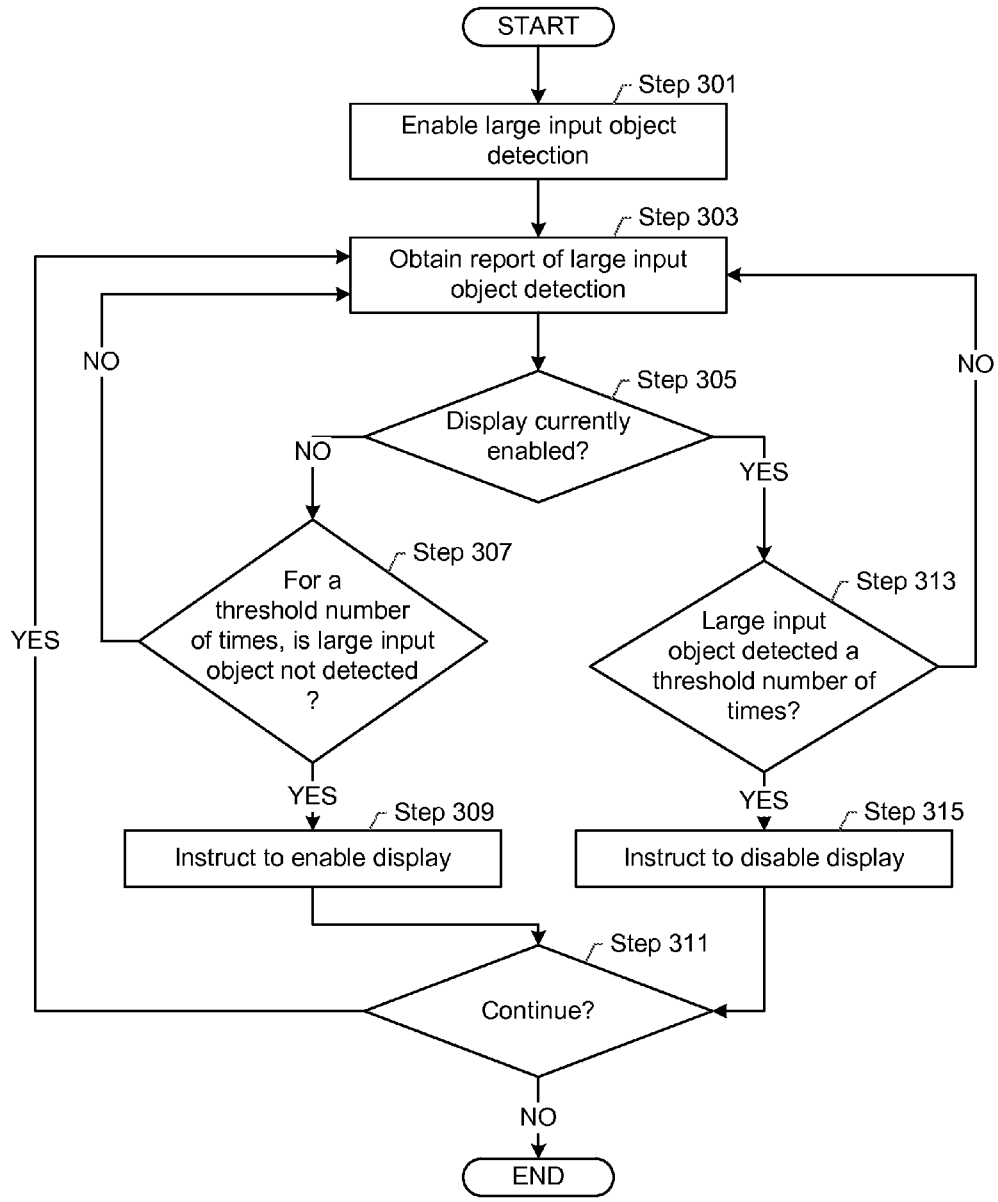

FIGS. 2, 3, 4.1, 4.2, 5, and 7 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that a condition exists in accordance with one or more embodiments of the invention. As another example, determination steps may be performed by performing a test, such as checking a data value to test whether the value is consistent with the tested condition in accordance with one or more embodiments of the invention. Further, the various flowcharts or portions of flowcharts may be combined to create a single flow for large input object management in accordance with one or more embodiments of the invention. Additionally, in some embodiments, one or more steps from a flowchart may be omitted.

FIG. 2 shows a flowchart for baseline management with large input object detection in accordance with one or more embodiments of the invention. In one or more embodiments of the invention, the steps of FIG. 2 may be performed by a peripheral device, such as in hardware, software, or firmware of a touchscreen. Alternatively or additionally, at least some of the steps may be performed on the host, such as in device driver or by a host operating system.

In Step 201, large input object detection is enabled in accordance with one or more embodiments of the invention. For example, a user may enable a setting to perform large input object detection, such as by using a settings menu of the host. In one or more embodiments of the invention, large input object detection may be enabled automatically, such as when one or more conditions exist. For example, a host may enable large input object detection when a phone call is received. In such embodiments, the host may enable the large input object detection to detect a user's face. Enabling large input object detection may be performed by setting a bit in a register. Other triggers and techniques for enabling large input object detection may be used without departing from the scope of the invention. Additionally, in some embodiments large input object detection may always be enabled.

In Step 203, a presence of an input object that satisfies a size threshold is determined to be in the sensing region using a first baseline in accordance with one or more embodiments of the invention. In one or more embodiments of the invention, positional information is determined. Determining positional information may include sensor electrodes transmitting sensing signals and receiving resulting signals that include effects corresponding to the sensing signals and any input object(s) in the sensing region. The resulting signals are adjusted according to a first baseline in order to remove any background noise, such as noise caused by the display device as well as any other environmental noise. Additional processing may be performed to determine a number, size, and location of input objects in the sensing region. Based on the enabling of the large input object detection, the size of the input object may be compared with the size threshold. If the size of the input object satisfies the size threshold, the input object is deemed large and additional processing of the large input object in accordance with FIG. 2 is performed.

In Step 205, the predefined time period is started in accordance with one or more embodiments of the invention. The predefined time period may be started by initializing a clock. The predefined time period is a time in which large input object detection is not performed and/or not reported as described in Step 207.

In Step 207, reporting of the input device is suppressed in accordance with one or more embodiments of the invention. In some embodiments, suppressing the reporting of positional information includes not scanning the sensing region for input objects. In other words, transmission and/or receiving of sensing signals may be halted during the time period of suppression. In other embodiments, scanning is performed and resulting signals are received. However, the resulting signals may be dropped or otherwise ignored prior to reporting the positional information during the time period of suppression. In other embodiments, the scanning is performed and the resulting signals are processed for other purposes than determining whether a large input object is present. In each of the above embodiments, the determination module may fail to report positional information to the host during the predefined time period of suppression. In other embodiments, one or more reports may be received by the device driver and/or operating system on the host, and ignored based on being in the predefined time period. Other mechanisms for suppressing the reporting of the input device may be used without departing from the scope of the invention.

In Step 209, a disabled state of the display of the host is determined in accordance with one or more embodiments of the invention. In particular, the display is disabled based on an input object satisfying a size threshold being in the sensing region. For example, if the input object is a face, a display of a smartphone may be disabled while the user is talking on the smartphone with the user's face next to the smartphone. In at least some embodiments, determining the disabled state of the display may be the host disabling the display. When the host disables the display, the host may set a bit in a register to indicate that the display is disabled. In additional or alternative embodiments, determining the disabled state of the display may include reading the register in which the state bit for the display is stored. If the bit is set to indicate that the display is disabled, then the disabled state is determined.

In Step 211, a determination is made whether the predefined time elapsed. If the predefined time period has not elapsed, then the flow continues to wait in Step 213. Once the predefined time period elapses, the flow continues with Step 215.

In Step 215, an absence of the input object may be determined in the sensing region using a second baseline in accordance with one or more embodiments of the invention. In other words, the baseline is switched from the first baseline to the second baseline based on determining the disabled state of the display. Thus, the second baseline accounts for the different background capacitance when the display is disabled versus when the display is enabled. Using the second baseline, large input object detection is performed. Large input object detection may be performed in a same or similar manner as discussed above with reference to Step 203 by determining positional information for the input object using the second baseline. Although not shown in FIG. 2, if an input object satisfying the size threshold is in the sensing region, then the flow may return to Step 205. However, in Step 215, an input object is determined not to satisfy the size threshold using the second baseline and the positional information.

In Step 217, an action is performed based on the absence of the input object in the sensing region. For example, the action may be to report the absence of the large input object, halt the suppressing of the reporting, enable the display, perform another action, or a combination of actions. In other words, because the large input object is not detected, the enabling of the display may be triggered. Thus, a user may use the display. Although not shown in FIG. 2, a bypass mechanism may exist that overrides the disabled state of the display. The bypass mechanism may allow a user at any time to enable the display and bypass further large input object detection.

FIG. 3 shows a flowchart for large input object detection in accordance with one or more embodiments of the invention. In one or more embodiments of the invention, FIG. 3 shows a flowchart for large input object detection using a polling based approach, such as by a host. In Step 301, large input object detection is enabled. Enabling large input object detection may be performed as discussed above with reference to Step 201 of FIG. 3.

In Step 303, a report of large input object detection is received in accordance with one or more embodiments of the invention. For example, the host may receive the report. The received report may include positional information and/or whether an input object satisfying a size threshold is detected in the sensing region. If the report does not include whether an input object satisfying a size threshold is in the sensing region, then the host may determine whether the input object satisfying the size threshold is in the sensing region from the positional information in the report. In some embodiments, the report of large input object detection may indicate that no large input object is present in the sensing region.

In Step 305, a determination is made whether the display is currently enabled. For example, determining whether the display is enabled may be based on the display state bit as discussed above with reference to FIG. 2 or another storage structure that indicates the state of the display.

If the display is disabled, a determination is made whether, for a threshold number of times, a large input object is not detected in Step 307. In other words, a counter may be incremented for each time that the report indicates that a large input object is not detected in the sensing region. When the counter reaches the threshold number, then, for a threshold number of times, the large input object is not detected in the sensing region. If the report directly or indirectly indicates the presence of the input object, the counter may be reset in some embodiments. Alternatively, if the report indicates the presence of the input object, the report may be ignored. In one or more embodiments of the invention, if the large input object is not determined to be absent for a threshold number of times, then the flow may continue with Step 303.

Once the large input object is determined to be absent a threshold number of times, an instruction is issued to enable the display in Step 309. For example, the host may enable the display. Alternatively, firmware or hardware on the input device may send a signal requesting the enabling of the display in accordance with one or more embodiments of the invention.

In at least some embodiments, the threshold number is more than one. Thus, in such embodiments, an input object only momentarily absent from the sensing region may not trigger an enabling of the display. However, if the input object is detected as being absent from the sensing region a threshold number of times, then the input object may be deemed absent from the sensing region for the purposes of enabling or disabling the display.

Further, a determination may be made whether to continue testing for large input object detection in Step 311. In other words, a determination may be made whether large input object detection is still enabled. If large input object detection is enabled, the flow may repeat with Step 311.

Returning to Step 305, if the display is enabled, a determination is made whether a large input object is detected a threshold number of times in Step 313. Determining whether large input object is detected a threshold number of times may be performed using a counter. In particular, the counter may be incremented each time a large input object is detected in the sensing region as denoted by a report. In some embodiments, if the report indicates an absence of the large input object, then the counter may be reset. In other embodiments, the counter is not reset. If the large input object is not detected a threshold number of times, the flow may repeat with Step 303. Once the large input object is detected a threshold number of times, than an instruction is issued to disable the display in Step 309. Disabling the display may be performed in a same or similar manner to enabling the display as discussed above with reference to Step 309. Further, the flow may proceed to determining whether to continue large input object detection in Step 311.

Although not shown in FIG. 3, determining whether an input object is detected or is absent a threshold number of times may include a timing aspect in which each of the threshold number is within a certain period of time. Such determination may be performed, for example, using a timer in conjunction with a counter. Further, although not shown in FIG. 3, at one or more times in the process, large input object detection may be disabled without enabling or disabling of the display. In other words, if large input object detection is disabled while performing Step 305, Steps 313 and 315 may be omitted.

FIGS. 4.1 and 4.2 show flowcharts for large input object detection in accordance with one or more embodiments of the invention. FIGS. 4.1 and 4.2 show flowcharts for large input object detection using an interrupt driven approach in accordance with one or more embodiments of the invention. In the interrupt driven mode, consider the scenario in which the large input object detection is enabled. FIG. 4.1 is performed each time an interrupt is received.

Turning to FIG. 4.1, in Step 401, an interrupt is received in accordance with one or more embodiments of the invention. In one or more embodiments of the invention, the interrupt is triggered when the large input object is detected in the sensing region or a change in whether a large input object is detected in the sensing region. The interrupt may also be triggered responsive to detection of the large input object, or absence of the large input object, exceeding a threshold number of detections. The interrupt may be transmitted from code on the firmware to another piece of code on the firmware, to the host, or to another component of the system.

In Step 403, a determination is made whether a large input object is detected in accordance with one or more embodiments of the invention. In particular, a determination may be whether, for the current frame, the large input object is detected in the sensing region. For example, the host may receive a report of a large input object being detected or absent.

If a large input object is detected, then a determination is made whether the display is currently enabled. Determining whether the display is enabled may be performed as discussed above with reference to Step 305 of FIG. 3. If the display is enabled, then a timer may be started in Step 409. If a timer is already started in Step 409 from a previous iteration, then the timer may be ignored and allowed to continue to run. If the display is not enabled, then the timer is cleared in Step 411. In other words, the timer is reset. Thus, if the display is disabled and a large input object is detected, then the timer is reset in order to prolong the time in which the display is disabled.

Returning to Step 403, if the large input object is not detected, then a determination is made whether the display is currently disabled in Step 407. Determining whether the display is disabled may be performed in a similar manner as discussed above with reference to Step 305 of FIG. 3. If the display is disabled, then a timer may be started in Step 409. If a timer is already started in Step 409 from a previous iteration, then the timer may be ignored and allowed to continue to run. If the display is enabled (i.e., not disabled), then the timer is cleared in Step 411. In other words, the timer is reset. Thus, if the display is enabled and a large input object is not detected, then the timer is reset in order to prolong the time in which the display is enabled.

FIG. 4.2 shows a flowchart for a process that consumes the timer in FIG. 4.1 in accordance with one or more embodiments of the invention. In Step 421, a determination is made whether the end of the timer is achieved. In other words, the determination is made whether the timer expired. If the timer has not expired, then the flow may wait. When the timer expires, a change of enabling of the display is reported to firmware in Step 423. For example, the display state bit may be set or reset to indicate the change. In the example, if the bit indicates that the display is enabled, then the bit is changed to indicate that the display is disabled. Conversely in the example, if the bit indicates that the display is disabled, then the bit is changed to indicate that the display is enabled.

Further, in Step 425, whether the display is enabled or disabled is changed in accordance with one or more embodiments of the invention. In other words, the host changes the state of the display from enabled to disabled or from disabled to enabled in response to the elapse or expiration of the timer.

Although not shown in FIGS. 4.1 and 4.2, the performance of FIGS. 4.1 and 4.2 may be dependent upon whether large input object detection is enabled. For example, if large input object detection is not enabled, then FIGS. 4.1 and 4.2 may not be performed.

Figure 5:
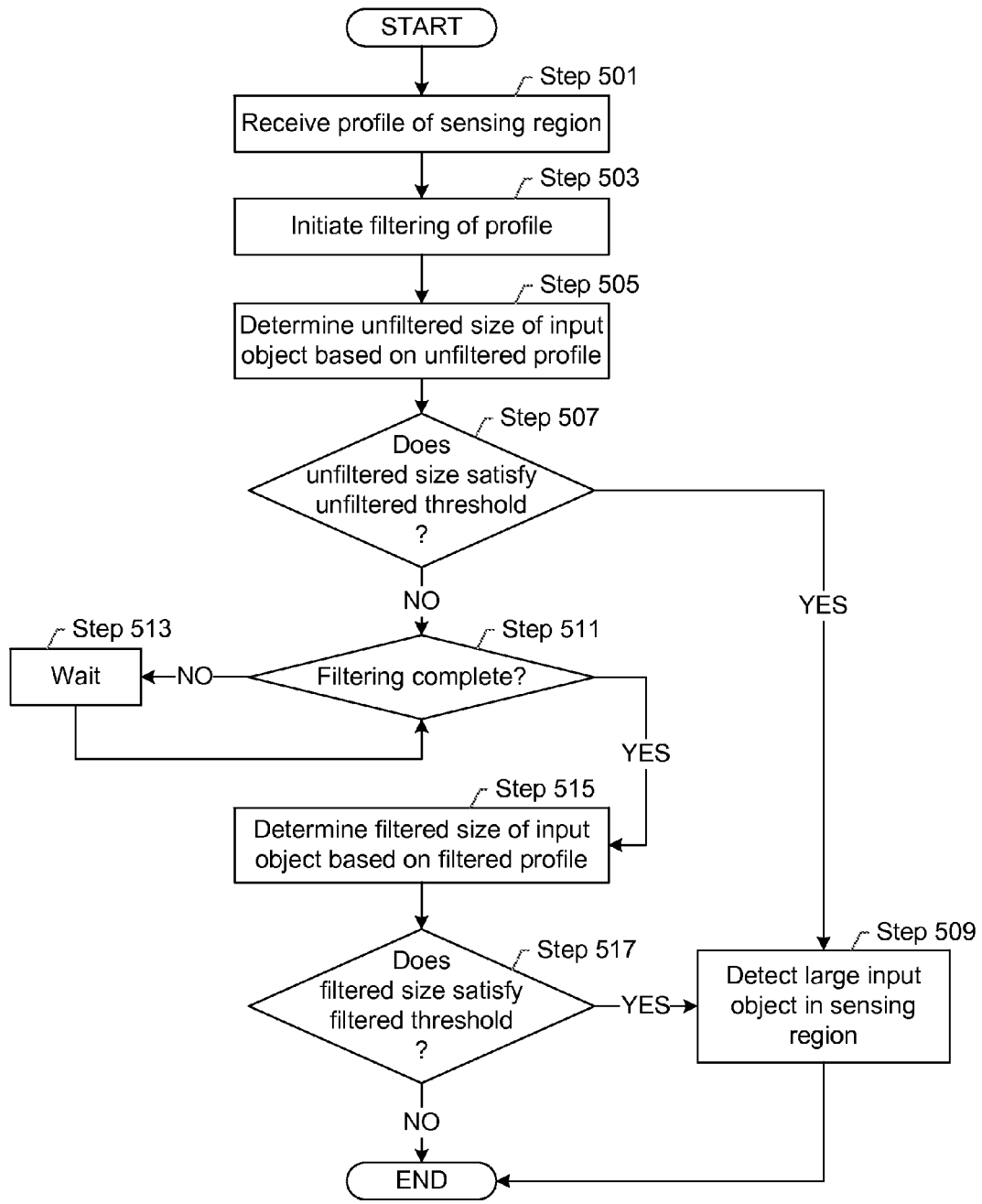
Figure 7:
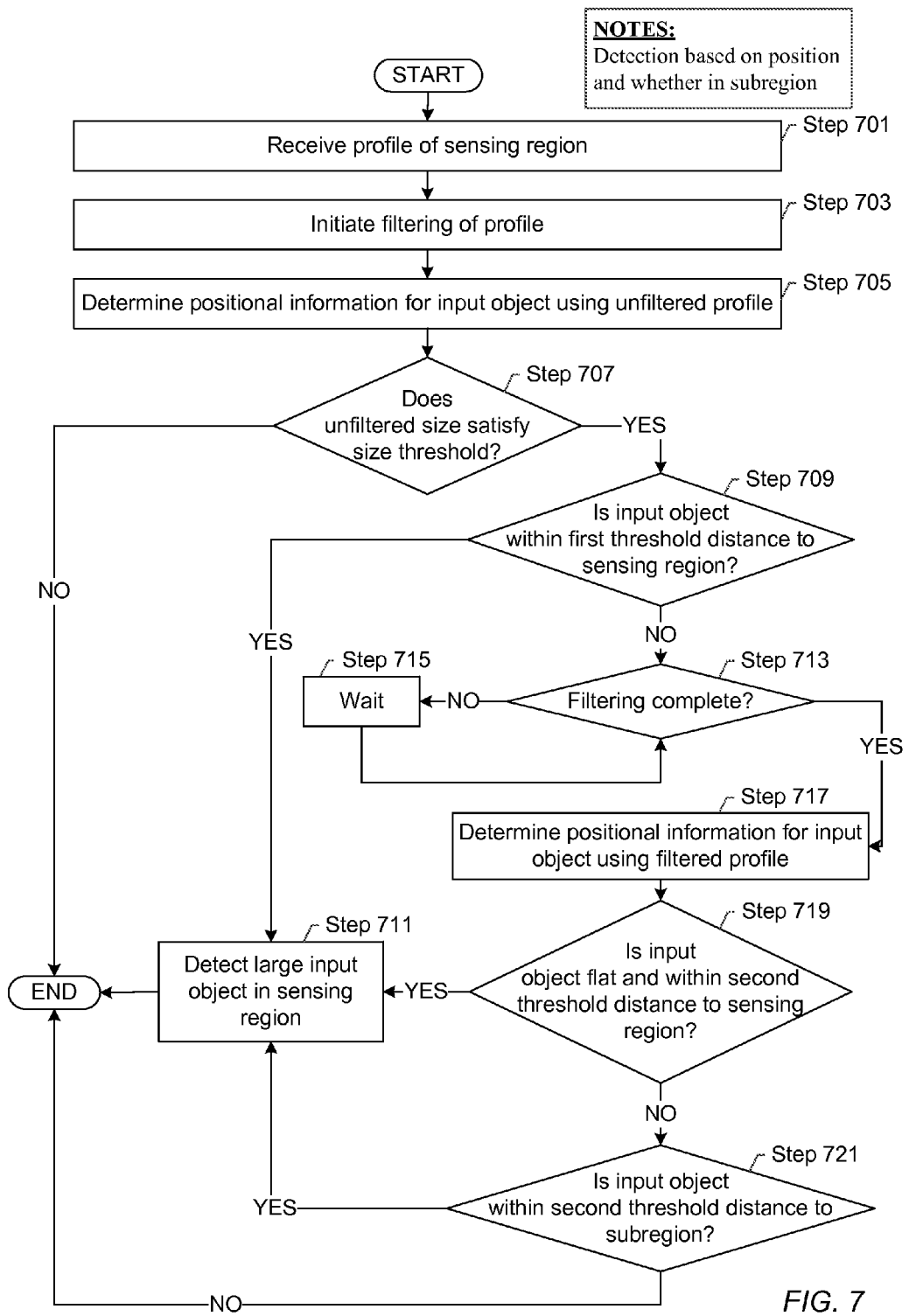

FIGS. 2, 3, 4.1 and 4.2 shows flowcharts for managing large input object detection through enabling or disabling the display. FIGS. 5 and 7 show flowcharts for determining whether a large input object is present in the sensing region. In one or more embodiments, FIG. 5 is an alternative to FIG. 7. However, steps of FIG. 5 may be combined with one or more steps of FIG. 7 to create additional alternatives.

Turning to FIG. 5, in Step 501, a profile of the sensing region is received in accordance with one or more embodiments of the invention. In one or more embodiments, sensor electrodes transmit sensing signals and resulting signals corresponding to the effects of the sensing signals are received. The resulting signals are measured and may be grouped into a profile. The profile may be received by firmware, a device driver, the host or another component.

In Step 503, filtering of the profile is initiated in accordance with one or more embodiments of the invention. In one or more embodiments, prior to filtering, the profile may be adjusted to according to a current baseline. In other words, each value in the profile is adjusted according to the corresponding value in the current baseline. Temporal and/or spatial filtering of the profile may be initiated to further reduce effects caused by noise. In the process of performing the filtering Steps 505 and 507 may be performed using the unfiltered profile.

In Step 505, the unfiltered size is determined based on the unfiltered profile in accordance with one or more embodiments of the invention. In one or more embodiments, the unfiltered size may be obtained, for example, by which area of the sensing region is covered by the input object. If the profile is along an axis and a second profile is obtained, then the position is defined by a portion of the profile that has values greater than a detection threshold. The length, obtained from one unfiltered profile on a first axis, may be multiplied by the width, obtained from another unfiltered profile on a different axis, in order to determine the unfiltered size. Other techniques for determining the unfiltered size may be used without departing from the scope of the invention. In one or more embodiments, the unfiltered size is a single value. In other embodiments, the unfiltered size may be a combination of values.

In Step 507, a determination is made whether the unfiltered size satisfies an unfiltered threshold in accordance with one or more embodiments. In other words, an unfiltered threshold is set to be the minimal size in which an input object is considered a large input object when using the unfiltered profile. The unfiltered size is compared against the unfiltered threshold.

In Step 509, if the unfiltered size satisfies the unfiltered threshold, then a large input object is detected as being in the sensing region. Although not shown in FIG. 5, a report may be generated that indicates the presence of the large input object. The report may be a notification, a setting of a bit, or any other data structure or communication mechanism that may be used to indicate the presence or absence of a large input object.

Returning to Step 507, if the unfiltered size does not satisfy the unfiltered threshold, then a determination is made whether the filtering is complete in Step 511. If the filtering is not complete, then the system may wait in Step 513 until the filtering is determined to be complete in Step 511.

When the filtering is complete, the filtered size of the input object is determined based on the filtered profile in Step 515. Determining the filtered size may be performed in a same or similar manner to determining the unfiltered size, but using filtered profile(s) in accordance with one or more embodiments of the invention.

In Step 517, a determination is made as to whether the filtered size satisfies the filtered threshold in accordance with one or more embodiments. In one or more embodiments of the invention, a separate filtered threshold exists that defines the minimum size when the filtered profile(s) is/are used. In one or more embodiments, the filtered threshold is smaller than the unfiltered threshold. In other embodiments, the filtered threshold may be the same size or larger than the unfiltered threshold.

If the filtered size satisfies the size threshold, then a large input object is detected in the sensing region in Step 509 as discussed above. If the filtered size does not satisfy the size threshold, then the large input object is not detected. Although not shown in FIG. 5, a report may be generated to indicate the absence of the input object.

Another mechanism for determining when an input object is a large input object may be based on the area in which the input object is detected and the size and shape of the input object. For example, in the case in which face detection is performed, an ear is smaller than a person's cheek, but generally is detected first and in the top portion of a mobile device.

Figure 6:
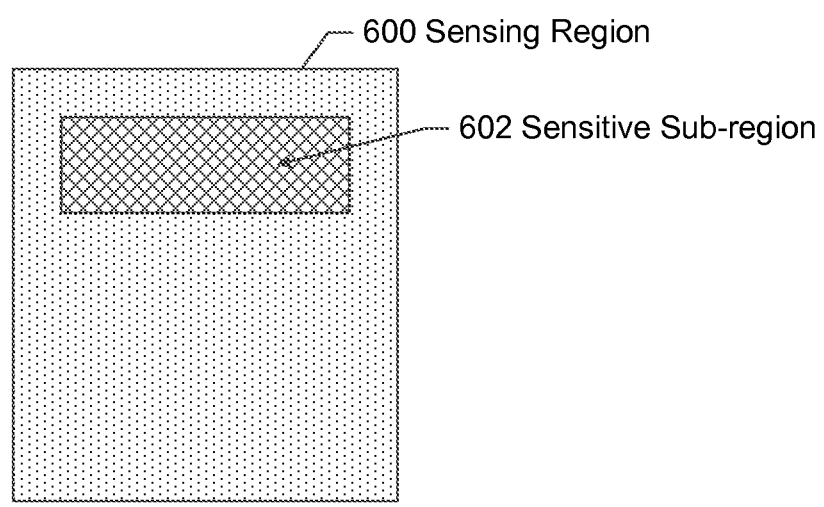
FIG. 6 shows an example sensing region in accordance with one or more embodiments of the invention.

FIG. 6 shows a schematic diagram of a sensing region (600) in accordance with one or more embodiments. As shown in the schematic diagram, the sensing region (600) may have a defined sub-region that is denoted as a sensitive sub-region (602). The sensitive sub-region (602) is sensitive in that the sensitive sub-region has a lower threshold or less constrictive rules for determining when a large input object is present in the sensing region. Thus, an input object is more likely to be detected as a large input object when the input object is in the sensitive sub-region (602) than when the input object is in the remaining sensing regions. In one or more embodiments, the position of the sensitive sub-region (602) may be defined in the portion of the determination module that performs the large input object detection.

FIG. 7 shows a flowchart for large input object detection based on sensitive sub-regions in accordance with one or more embodiments. In Step 701, a profile of the sensing region is received in accordance with one or more embodiments. In Step 703, filtering of the profile is initiated in accordance with one or more embodiments. Steps 701 and 703 may be performed in a same or similar manner to Steps 501 and 503, respectively, in FIG. 5.

In Step 705, positional information is determined for the object using the unfiltered profile. In one or more embodiments, the determined positional information may include position, shape, and distance to the input object. The shape may include whether the input object is flat or curved, such as by whether the distance to the input object is within a threshold amount of being constant. Determining the positional information may be performed as discussed above with reference to Step 505 of FIG. 5. Distance may be determined based on the strength of the values in the profile.

In Step 707, a determination is made whether the unfiltered size satisfies a size threshold in accordance with one or more embodiments. If the unfiltered size does not satisfy the size threshold, then a large input object may be determined to be absent from the sensing region. A report may be generated to denote the absence of the large input object. Although shown in FIG. 7, once filtering is complete, a filtered size may be determined and used to determine whether a large input object is present as discussed above with reference to FIG. 5.

Continuing with Step 707, if the unfiltered size satisfies a size threshold, then a determination may be made whether the input object is within a first threshold distance to the sensing region in Step 709. In one or more embodiments, the distance to the input object is determined from the positional information. The distance may be a minimum distance, an average distance, a maximum distance or another statistic of the distance. The distance value and corresponding threshold(s) may be defined as an estimation of distance or defined in terms of signal strength. If the input object is within the first threshold distance, then a large input object is detected in the sensing region in Step 711. A report may be generated to indicate the presence of the large input object.

If the input object is not within the first threshold distance, the flow may proceed to Step 713. In Step 713, a determination is made whether the filtering is complete. If the filtering is not complete, then the system may wait in Step 715 until the filtering is determined to be complete in Step 713.

In one or more embodiments of the invention, positional information is determined from the filtered profile in Step 717. Determining positional information from the filtered profile may be performed similar to the manner discussed above with reference to Step 705.

In Step 719, a determination is made whether the input object is flat and within a second threshold distance to the sensing region. If the input object is flat and within the second threshold distance to the sensing region, then a large input object is detected in the sensing region in Step 711.

If the input object is not flat and/or not within a second threshold distance to the sensing region, then a determination is made whether the input object is within the second threshold distance to the sensitive sub-region in accordance with one or more embodiments in Step 721.

If the input object is within the second threshold distance to the sensitive sub-region, then the input object may be deemed to be a large input object in Step 711. In other words, an input object that is not flat may still be considered to be a large input object when the input object is within the second threshold distance to the sensitive sub-region. Thus, in the case of face detection, one or more embodiments may accommodate an ear that is close to the sensitive sub-region while not erroneously detecting a palm that is on the bottom of the sensing region for the purposes of determining whether to disable the display.

In one or more embodiments, the first threshold distance is less than the second threshold distance. In such embodiments, a large object that is very close to the sensing region may be detected as a large input object regardless of whether the large object is flat or very close to the sensitive sub-region.

Figure 8:
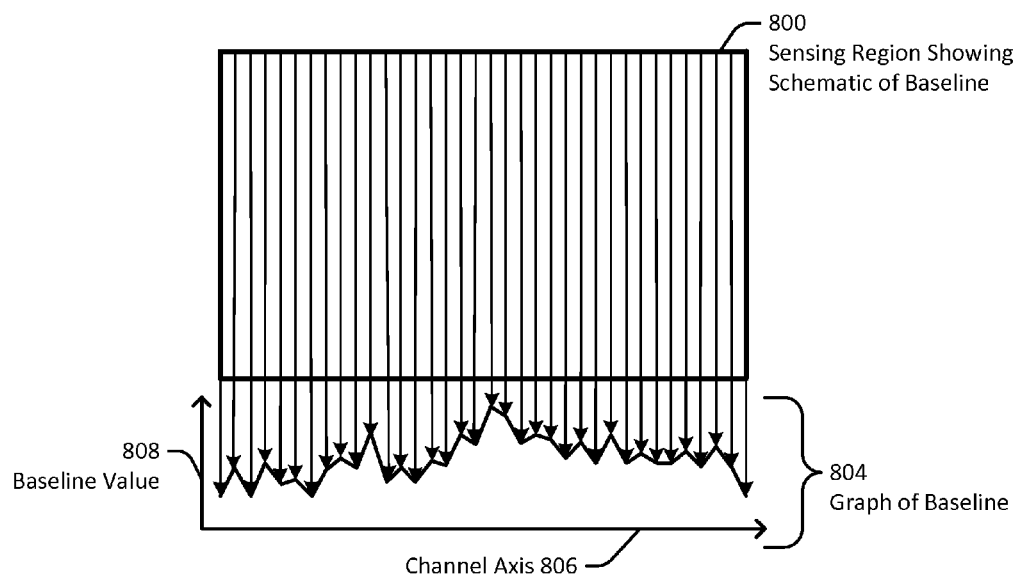
FIG. 8 shows an example for baseline management in accordance with one or more embodiments of the invention.

As discussed above with reference to FIG. 2, one or more embodiments change the baseline when a large input object is detected and the display is disabled. FIG. 8 shows an example diagram mapping an example baseline to a sensing region. In particular, the top portion of the example shows a sensing region with a schematic of the channels (800) in accordance with one or more embodiments of the invention. As shown in the top portion, the sensing region is partitioned into channels, shown as vertical lines, along the horizontal axis. A channel may correspond to a particular sensor electrode. A similar partitioning may alternatively or additionally exist along another axis, such as the vertical axis.

Each channel may have a corresponding value in the baseline as denoted in the graph (804). In other words, the graph maps the channel axis (806) to a baseline value (808) for each particular channel. The baseline value is the background noise estimation for the channel.

In one or more embodiments of the invention, when the display is enabled, a first baseline may be used. The first baseline may be switched to a second baseline when the display is disabled. In one or more embodiments of the invention, the switch may be performed by changing each channel by a corresponding change amount. The change amount reflects the difference between the background capacitance when the display is enabled versus when the display is disabled. The change amount may differ between channels. Channels which do not have constant or within a threshold amount of constant change amounts may be ignored. In other words, a baseline value may not exist for such channels when the display is disabled.

Thus, in one or more embodiments, changing the baseline may be performed by, iteratively for each channel that has a change amount, adding or subtracting the change amount from the baseline value to obtain a new baseline value. The collection of new baseline values may be stored as the new baseline. Because the change amounts are used for changing the baseline, a different baseline may be used without first waiting for input objects to be absent from the sensing region. In one or more embodiments of the invention, determining the change amount may be performed using experimentation, as part of original configuration, or using other techniques.

The following example is for explanatory purposes only and not intended to limit the scope of the invention. For the following example, consider the scenario in which Bob is calling Company X with Bob's smartphone. When Bob starts dialing, the display is enabled to allow Bob to see the display. When Bob selects a user interface button to initiate the call, the host may initiate large input object detection. In response, the firmware for the touchscreen display may start determining whether a large input object is present in the sensing region.

As Bob brings the smartphone to his ear, the firmware detects that an input object satisfying a size threshold is within a threshold distance to the sensitive sub-region. The detection is made using the first baseline. Thus, the firmware notifies the host, which turns off the display. The firmware switches to using a second baseline by updating each baseline value in the first baseline with the corresponding change value to obtain a second baseline. Then, the firmware continues to detect whether Bob's ear or cheek is present in the sensing region using the second baseline. Because Bob's ear or cheek remains present while Bob is calling Company X, the display remains disabled.

However, when Bob moves his smartphone so that he can see the smartphone and select an option using a keypad displayed on the smartphone, the firmware stops detecting Bob's face. Thus, the firmware notifies the host, which turns on the display. Because the display is turned on, the firmware uses the first baseline again. Because a call is still in progress, large input object detection may still be performed. Thus, when Bob selects the option and moves the smartphone back to his ear, the firmware notifies the host that a large input object is detected, the host disables the display, and the firmware switches to using the second baseline. The host may disable large input object detection when Bob completes the phone call. Although the above is discussed with regards to Bob's face, a similar technique may be used when Bob puts the phone in his pocket.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for face detection management, the method comprising:
   determining, for a first time, a presence of an input object in a sensing region of a capacitance input device,
      wherein the presence is determined for the first time using a first baseline, and
      wherein the input object satisfies a size threshold;
   suppressing a reporting of capacitance input device during a predefined time period based on the presence of the input object;
   determining a disabled state of a display of a host, wherein the disabled state is in response to determining the presence of the input object for the first time;
   determining, in response to an elapse of the predefined time period and for a second time, an absence of the input object in the sensing region, wherein the absence of the input object is determined for the second time using a second baseline to account for the disabled state of the display;
   performing an action based on determining the absence of the input object.

2. The method of claim 1, wherein the action comprises reporting the absence of the input object.

3. The method of claim 1, wherein the action comprises enabling the display of the capacitance input device.

4. The method of claim 1, wherein suppressing the reporting comprises ignoring each report generated by the capacitance input device during the predefined time period.

5. The method of claim 1, wherein suppressing the reporting comprises failing to report positional information to the host during the predefined time period.

6. The method of claim 1, wherein determining the disabled state of the display comprises disabling the display.

7. The method of claim 1, wherein determining the disabled state of the display comprises reading a register corresponding to the display.

8. The method of claim 1, further comprising:
   prior to determining the absence of the input object in the sensing region:
      determining, after the elapse of the predefined time period and for a threshold number of times, the presence of the input object in the sensing region, wherein the presence of the input object is determined for the threshold number of times using the second baseline,
      wherein the display is continually disabled based on the presence of the input object being determined for the threshold number of times.

9. A processing system for capacitance sensing of a capacitive input device, comprising:
   a sensor module comprising sensor circuitry configured to be coupled to a plurality of sensor electrodes, the sensor module configured to generate sensing signals received with the plurality of sensor electrodes; and
   determination circuitry connected to the plurality of sensor electrodes and configured to:
      obtain a profile from the sensing signals,
      determine, for a first time, a presence of an input object in a sensing region using the profile,
         wherein the presence is determined for the first time using a first baseline, and
         wherein the input object satisfies a size threshold,
      suppress a reporting of the capacitance input device during a predefined time period based on the presence of the input object, determine a disabled state of a display of a host, wherein the disabled state is in response to determining the presence of the input object for the first time, change, in response to the disabled state of the display, the first baseline to a second baseline to account for the disabled state of the display, determine, in response to an elapse of the predefined time period and for a second time, an absence of the input object in the sensing region, wherein the absence of the input object is determined for the second time using the second baseline, and issue a report to the host based on determining the absence of the input object.

10. The processing system of claim 9, wherein the profile is an unfiltered profile and wherein the determination circuitry is further configured to:

determine a first size of the input object using the unfiltered profile;

determine that the first size fails to satisfy an unfiltered threshold;

filter the unfiltered profile to obtain a filtered profile;

determine a second size of the input object using the filtered profile; and determine that the second size satisfies a filtered threshold, wherein the presence of the input object is determined based on the second size satisfying the filtered threshold.

11. The processing system of claim 10, wherein the determination circuitry is further configured to:

determine a sub-region of the sensing region comprising the input object, wherein the presence of the input object is further determined based on the sub-region being within a sensitive region of the sensing region.

12. The processing system of claim 10, wherein the determination circuitry is further configured to:

determine that the input object comprises a flat surface facing the sensing region, wherein the presence of the input object is further determined based on the input object comprising the flat surface.

13. The processing system of claim 9, wherein the profile is an unfiltered profile and wherein the determination circuitry is further configured to:

determine a size of the input object using the unfiltered profile; and determine that the size satisfies an unfiltered threshold, wherein the presence of the input object is determined based on the size satisfying the unfiltered threshold.

14. The processing system of claim 9, wherein the determination circuitry is further configured to:

determine, from the sensing signals, a number of a plurality of pixels saturated by the input object, wherein the presence of the input object is determined based on the number of the plurality of pixels saturated by the input object satisfying a saturation threshold.

15. The processing system of claim 9, wherein the first baseline comprises a first baseline value for each of a plurality of channels, wherein changing the first baseline to a second baseline comprises changing the first baseline value for each of the plurality of channels by heterogeneous amounts to generate a second baseline value for each of the plurality of channels.

16. The processing system of claim 9, wherein the determination circuitry is further configured to:

prior to determining the absence of the input object in the sensing region:

determine, after the elapse of the predefined time period and for a threshold number of times, the presence of the input object in the sensing region, wherein the presence of the input object is determined for the threshold number of times using the second baseline, wherein the display is continually disabled based on the presence of the input object being determined for the threshold number of times.

17. An input device comprising:

a plurality of sensor electrodes configured to generate sensing signals; and processing circuitry connected to the plurality of sensor electrodes and configured to:

obtain a profile from the sensing signals, determine, for a first time, a presence of an input object in a sensing region using the profile, wherein the presence is determined for the first time using a first baseline, and wherein the input object satisfies a size threshold, suppress a reporting of the input device during a predefined time period based on the presence of the input object, determine a disabled state of a display of a host, wherein the disabled state is in response to determining the presence of the input object for the first time, change, in response to the disabled state of the display, the first baseline to a second baseline to account for the disabled state of the display, determine, in response to an elapse of the predefined time period and for a second time, an absence of the input object in the sensing region, wherein the absence of the input object is determined for the second time using the second baseline, and issue a report to the host based on determining the absence of the input object.

18. The input device of claim 17, wherein the profile is an unfiltered profile and wherein the processing circuitry is further configured to:

determine a first size of the input object using the unfiltered profile;

determine that the first size fails to satisfy an unfiltered threshold;

filter the unfiltered profile to obtain a filtered profile;

determine a second size of the input object using the filtered profile; and determine that the second size satisfies a filtered threshold, wherein the presence of the input object is determined based on the second size satisfying the filtered threshold.

19. The input device of claim 17, wherein the first baseline comprises a first baseline value for each of a plurality of channels, wherein changing the first baseline to the second baseline comprises changing the first baseline value for each of the plurality of channels by heterogeneous amounts to generate a second baseline value for each of the plurality of channels.

20. The input device of claim 17, wherein the processing circuitry is further configured to:

prior to determining the absence of the input object in the sensing region:

determine, after the elapse of the predefined time period and for a threshold number of times, the presence of the input object in the sensing region, wherein the presence of the input object is determined for the threshold number of times using the second baseline, wherein the display is continually disabled based on the presence of the input object being determined for the threshold number of times.

\* \* \* \* \*